United States Patent [19]
Ishikawa et al.

[11] Patent Number: 5,896,823
[45] Date of Patent: Apr. 27, 1999

[54] METHOD OF MANUFACTURING HEAD REST SKIN

[75] Inventors: Hiyoshi Ishikawa; Akinori Teranishi, both of Anjo, Japan

[73] Assignee: Inoac Corporation, Aichi, Japan

[21] Appl. No.: 08/855,993

[22] Filed: May 14, 1997

[30] Foreign Application Priority Data

May 14, 1996 [JP] Japan ..................... 8-145191

[51] Int. Cl.$^6$ ............. D05B 97/00; B60N 2/48; B29C 65/08; B29C 65/48
[52] U.S. Cl. ............... 112/475.06; 112/475.08; 297/220
[58] Field of Search ............ 112/475.08, 475.06, 112/475.01; 297/391, 397, 220; 156/73.1, 93

[56] References Cited

U.S. PATENT DOCUMENTS

| | | | |
|---|---|---|---|
| 4,165,125 | 8/1979 | Owen | 297/220 |
| 5,345,633 | 9/1994 | Harnish | 297/397 |
| 5,405,190 | 4/1995 | Jeffcoat et al. | 297/391 |

FOREIGN PATENT DOCUMENTS

| | | | |
|---|---|---|---|
| 2506288 | 4/1996 | Japan | B29C 39/10 |
| 4-40181 | 7/1997 | Japan | B29C 65/78 |

*Primary Examiner*—Peter Nerbun
*Attorney, Agent, or Firm*—Sughrue, Mion, Zinn, Macpeak & Seas, PLLC

[57] ABSTRACT

In order to manufacture a head rest skin as a final product, a main portion (G) of the skin, which lacks a lower surface portion (K) of the skin, necessary to complete the head rest skin as the final product, is prepared first. Then, a lower surface opening peripheral edge (g) of the main portion (G) of the skin is turned up to expose a back surface of the skin, and a decorated surface (I) of the main portion (G) of the skin is folded into the turned up lower surface opening peripheral edge. A peripheral edge (k) of a lower surface portion (K) of the skin and the lower surface opening peripheral edge (g) of the main portion (G) of the skin are overlapped one upon another in such a manner that the decorated surfaces of these edges (g), (k) confront each other with the back surface (R) of the lower surface portion (K) of the skin facing outward, and the overlapped peripheral edge portions are thereafter joined. Then, the main portion (G) of the skin on the decorated surface side is pulled out by taking advantage of a slit 9 formed in the lower surface portion (K) of the skin so that the skin is arranged right side out.

10 Claims, 8 Drawing Sheets

METHOD OF MANUFACTURING HEAD REST SKIN

BACKGROUND OF THE INVENTION

1. Field of the Invention

The present invention relates to a method of manufacturing a head rest skin that covers a foamed head rest body by means of skin-integral molding. More particularly, the present invention is directed to a method of manufacturing a head rest skin adapted for pierced head rests.

2. Description of the Related Art

A pierced head rest is one type of head rest that is mounted on an upper portion of a seat back of an automobile or the like. Such head rest is usually formed into a skinned foamed product having a head resting hole in the middle thereof, and is designed so that a skin is covered over the foamed product.

This type of pierced head rest has heretofore been manufactured exclusively by covering a foamed body which has been previously prepared. As a result of this manufacturing method, a fastener is arranged around the outer circumference of the skin, and this has elevated the cost of manufacture. While different methods based on skin integrated molding employing no fastener have been proposed, it is still difficult to sew up skin forming pieces together without exposing outlet seams.

Under such circumstances, a method of sewing up skin forming pieces one by one to form an annular shape has been proposed in, e.g., Examined Japanese Patent Publication No. Hei. 4-40181.

The art disclosed in the aforementioned publication is characterized as joining together the opening edges of split cubic cylindrical segments formed of a plurality of skin forming pieces. This method has imposed a problem that the joining operation is cumbersome and time-consuming. Further, there exists also a problem that a special sewing machine such as a spot sewing machine must be employed during the process of joining one cylindrically sewn up skin forming segment to another, since the diameter of each such cylindrically sewn up skin forming segment is small.

SUMMARY OF THE INVENTION

The present invention has been made to overcome the aforementioned problems, and therefore an object of the present invention is to provide a method of manufacturing a head rest skin which can be applied not only to ordinary pillow-like head rests but also to pierced head rests and which allows such head rest skin to be finished extremely simply without exposing outlet seams and without employing a special machine.

To achieve the above object, a first aspect of the invention is applied to a method of manufacturing a head rest skin, which involves the steps of: first preparing, in order to manufacture the head rest skin as a finished product, a main portion of the skin that lacks a lower surface portion of the skin necessary to complete the head rest skin as the finished product; then putting a back surface of the skin out while turning up a lower surface opening peripheral edge of the main portion of the skin and folding in a decorated surface of the main portion of the skin; thereafter overlapping a peripheral edge of the lower surface portion of the skin on the lower surface opening peripheral edge of the main portion of the skin in such a manner that decorated surfaces of the peripheral portions confront each other with the back surface of the lower surface portion of the skin facing outward and sewing up the overlapped peripheral portions together; and thereafter putting the right side of the skin out by pulling the main portion of the skin on the decorated surface side out by taking advantage of a slit formed in the lower surface portion of the skin. The word "join" is intended to mean not only joining by sewing, but also joining by means of an adhesive, hot joining by means of radio frequency and ultrasonic wave, and the like.

A second aspect of the invention is applied to a method of manufacturing a head rest skin according to the first aspect of the invention, wherein the main portion of the skin is formed by joining a plurality of skin forming pieces in combination so that the main portion of the skin without a lower surface portion of the skin is prepared for a pierced head rest skin.

A third aspect of the invention is applied to a method of manufacturing a head rest skin according to the second aspect of the invention, wherein the main portion of the skin is formed of a horseshoe-shaped skin forming piece and a plurality of skin forming pieces; and the main portion of the skin for a pierced head rest skin is prepared by following the steps of: overlapping the horseshoe-shaped skin forming piece on the respective skin forming pieces in such a manner that decorated surfaces thereof confront one another; forming a horseshoe-shaped tubed skin forming body by sewing up the overlapped peripheral portions together; and thereafter overlapping skin forming pieces for joining both sides of inner side lower edge portions of the tubed skin forming body one upon another in such a manner that decorated surfaces thereof confront each other, and sewing up the overlapped portions together.

A fourth aspect of the invention is applied to a method of manufacturing a head rest skin according to any one of the first to third aspects of the invention, wherein the lower surface portion of the skin is formed by joining two small skin forming pieces having middle portions of confronting edges thereof projected and by forming the slit between the middle portions while leaving the middle portions unjoined.

According to the first aspect of the invention, the back surface of the skin is put outside by turning up the lower surface opening peripheral edge of the main portion of the skin, and the peripheral edge of the lower surface portion of the skin is overlapped on the lower surface opening peripheral edge of the main portion of the skin in such a manner that the decorated surfaces of such peripheral edges confront each other with the back surface of the lower surface portion of the skin facing outward. As a result, such overlapped peripheral edge portions are arranged flat. Hence, these peripheral edge portions can be sewn up using an ordinary sewing machine simply.

When the main portion of the skin on the decorated surface side is pulled out by taking advantage of the slit, the skin is arranged the right side out with ease. This operation of arranging the right side out allows all the outlet seams to be concealed, which in turn makes the finished product good looking. Here, a head rest with which a skin is integrated by molding must have a slit that serves as a foaming material charging port in the head rest skin thereof. Therefore, this slit can be taken advantage of in order to pull the main portion of the skin on the decorated surface side out. As a result, there is no need to form a new slit.

When a plurality of skin forming pieces are sewn up in combination, and the main portion of the skin without the lower surface portion of the skin is formed for a pierced head rest skin as proposed by the second aspect of the invention, a head rest skin even of a pierced type can be manufactured extremely simply.

If a pierced head rest skin is formed by using a horseshoe-shaped skin forming piece as proposed by the third aspect of the invention, the number of seams is reduced in the horseshoe-shaped skin forming piece. Therefore, when such horseshoe-shaped skin forming piece is assigned to the front side, a head rest that does not give uncomfortableness but gives a sense of good feeling to a user when the user puts his or her head on the head rest can be prepared.

According to the fourth aspect of the invention, the projecting middle portions are arranged inside the skin at the time of charging the foaming material. Therefore, the slit is spontaneously closed in response to the foaming pressure applied by foaming.

The above and other objects and features of the present invention will be more apparent from the following description taken in conjunction with the accompanying drawings.

DETAILED DESCRIPTION OF THE PREFERRED EMBODIMENTS

A method of manufacturing a head rest skin according to preferred embodiments of the present invention will now be described in detail.

FIGS. 1 to 14 show a method of manufacturing a head rest skin for an automobile head rest of a pierced type.

Figure 1:
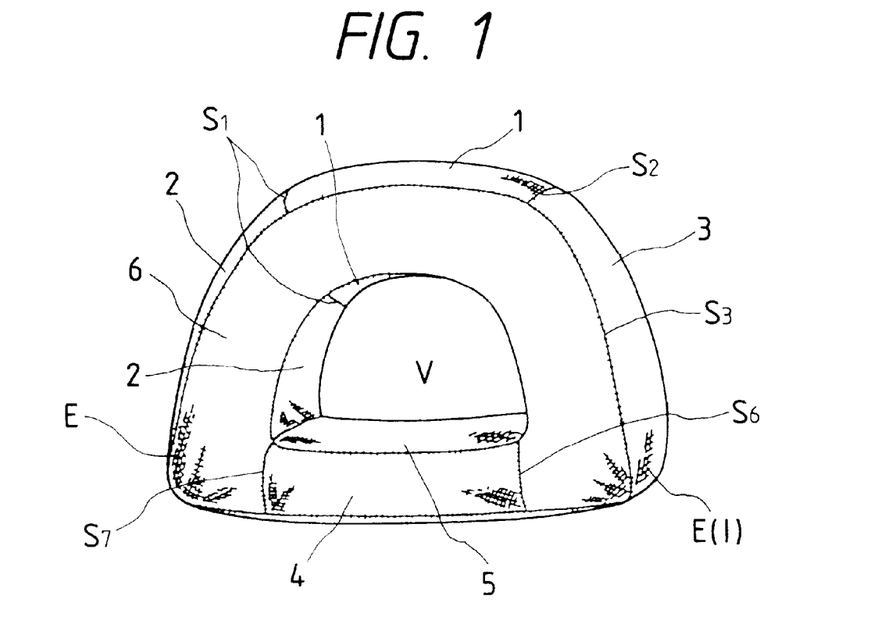
FIG. 1 is a perspective view of a head rest skin, which is a mode of embodiment of the present invention, the skin being viewed from the front side.
Figure 2:
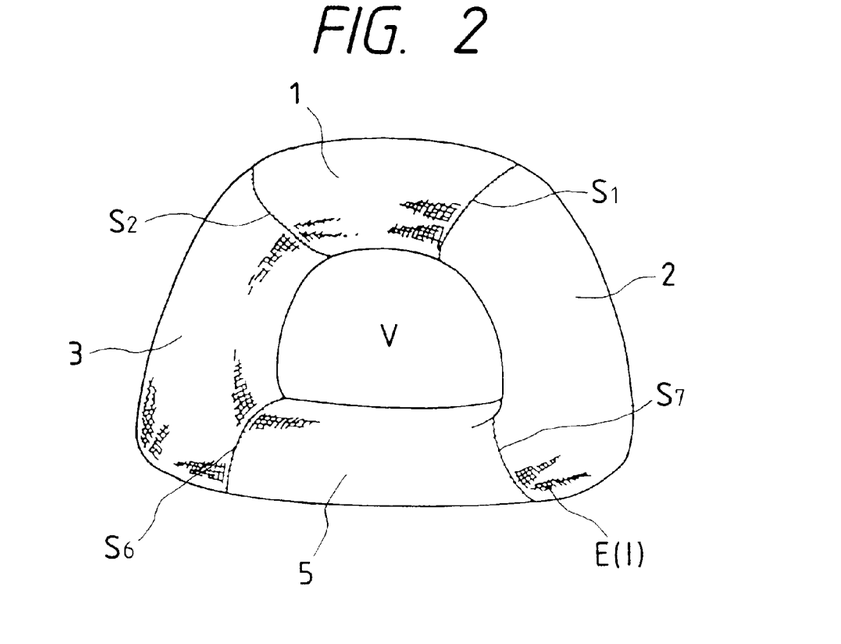
FIG. 2 is a perspective view of the head rest skin shown in FIG. 1 as viewed from the rear side.
Figure 3:
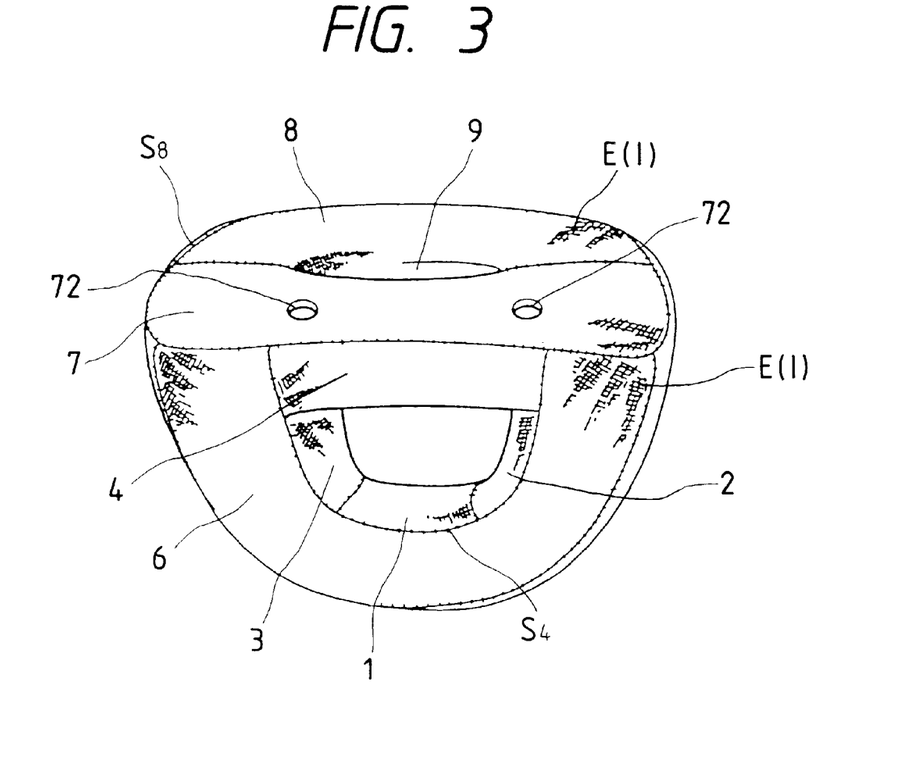
FIG. 3 is a perspective view of the head rest skin shown in FIG. 1 as viewed from the bottom side.
Figure 4:
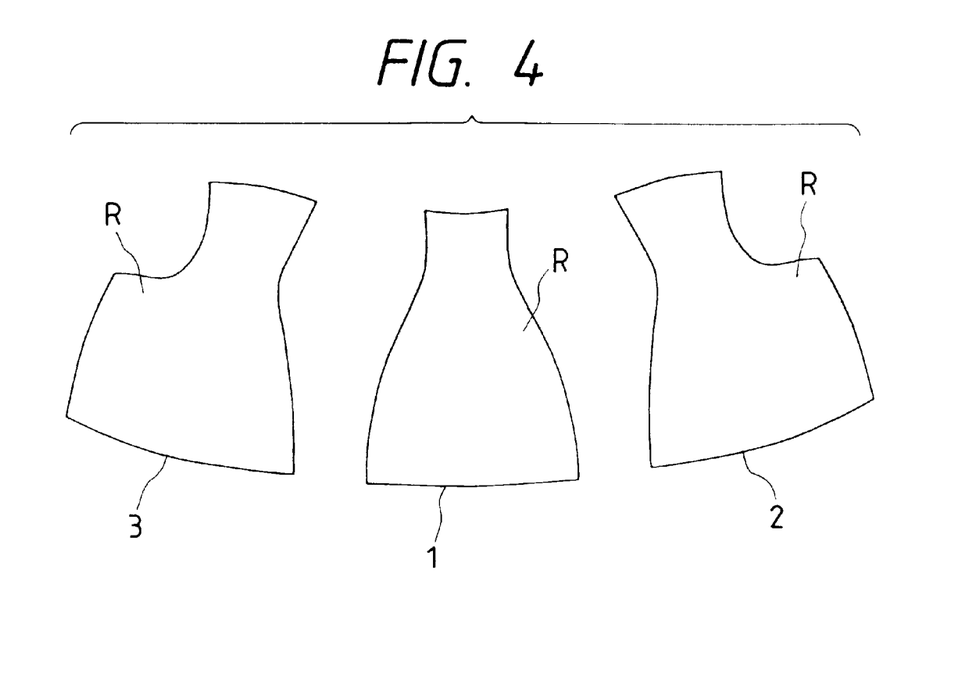
FIG. 4 is a plan view of three skin forming pieces, each forming a part of the head rest skin.
Figure 5:
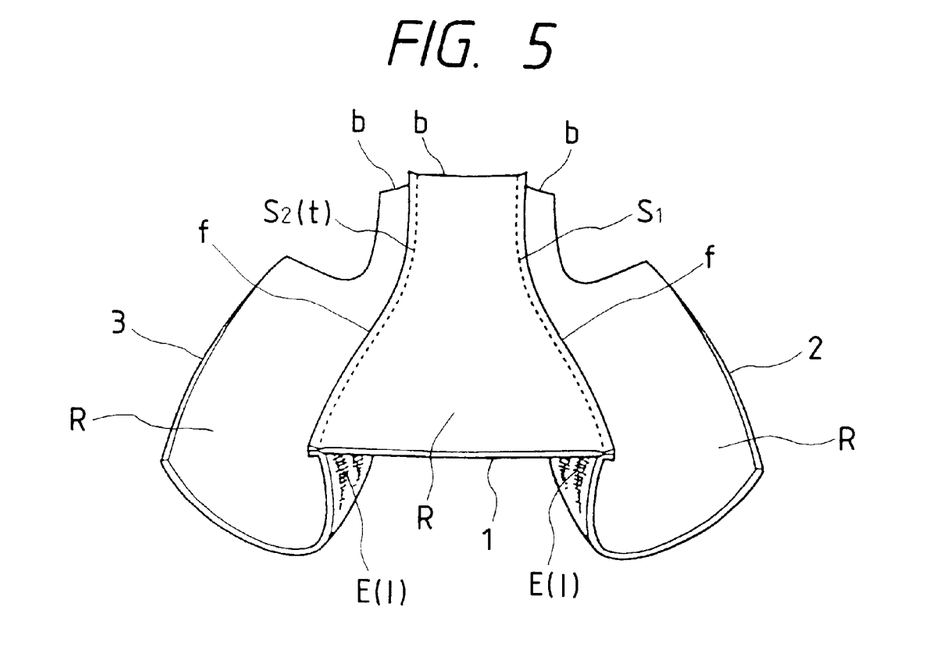
FIG. 5 is a perspective view showing a condition in which the skin forming pieces shown in FIG. 4 have been sewn up together.
Figure 6:
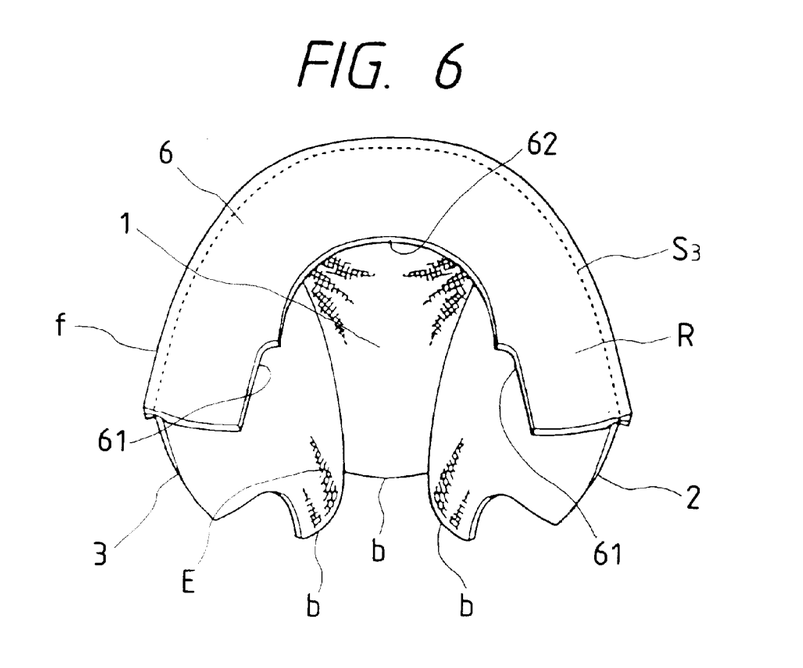
FIG. 6 is a perspective view showing a condition in which a horseshoe-shaped skin forming piece is additionally sewn up with the already sewn up skin forming pieces shown in FIG. 5.
Figure 7:
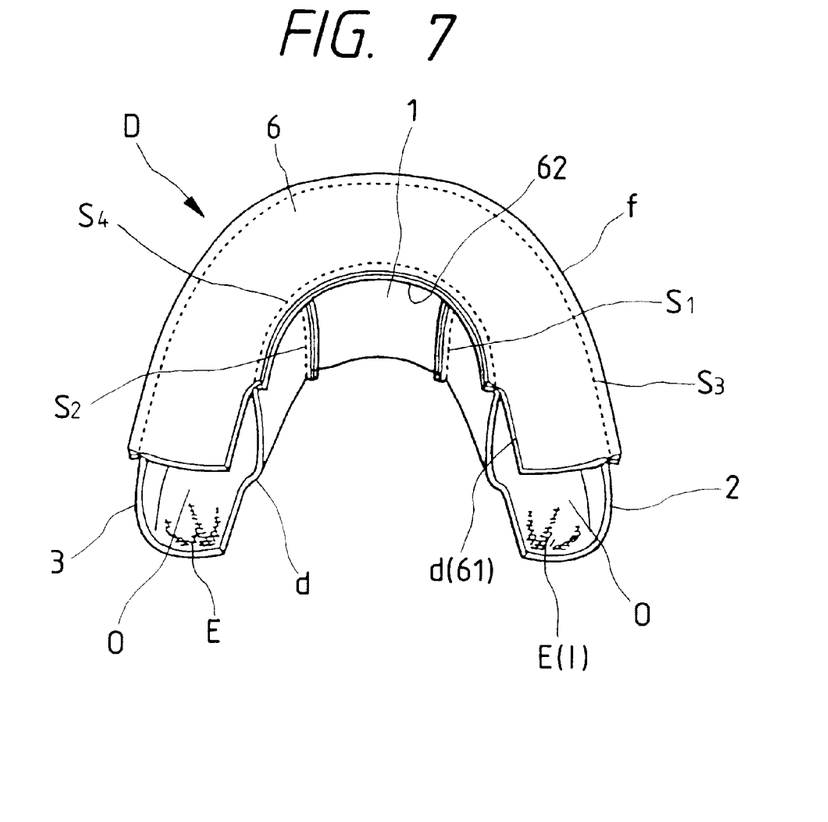
FIG. 7 is a perspective view of a horseshoe-shaped tubed skin forming body.
Figure 8:
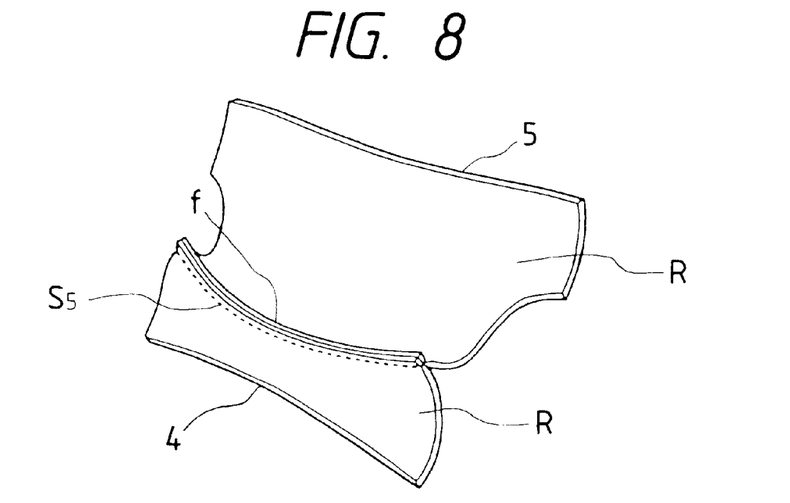
FIG. 8 is a perspective view of skin forming pieces that are formed into a lower side cylindrical portion of the head rest skin so that a main portion of the skin is formed out of the tubed skin forming body shown in FIG. 7.
Figure 9:
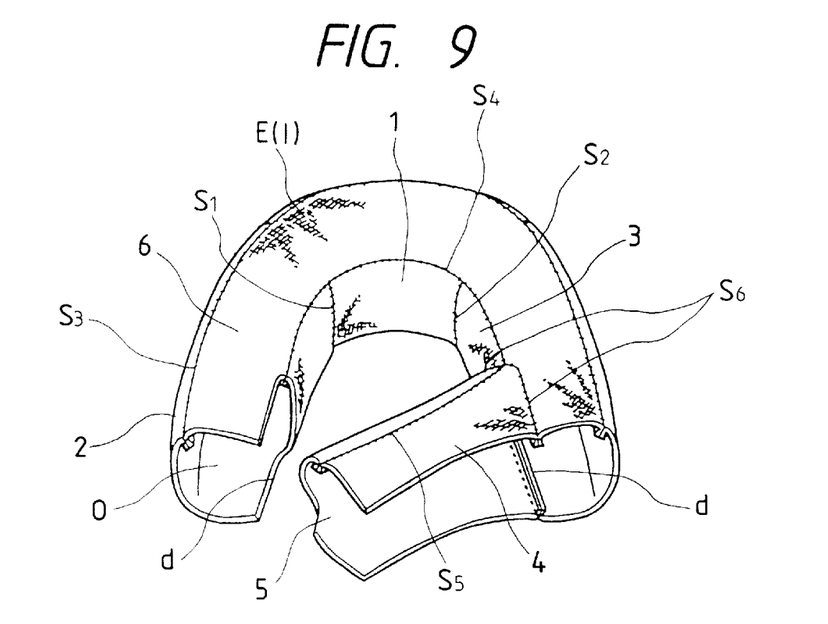
FIG. 9 is a perspective view showing a condition in which the skin forming pieces shown in FIG. 8 are sewn up with the tubed skin forming body shown in FIG. 7.
Figure 10:
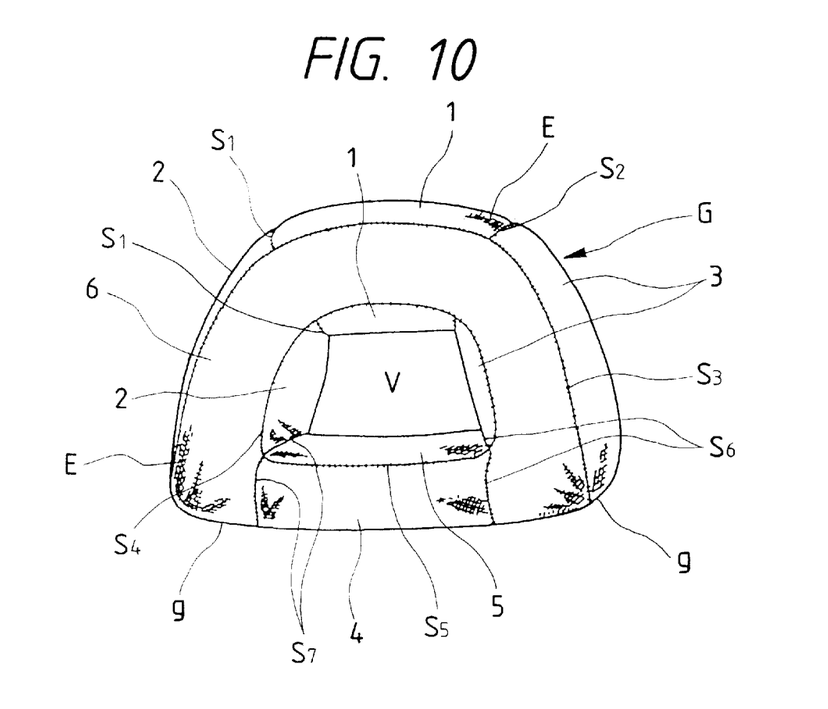
FIG. 10 is a perspective view of the main portion of the skin.
Figure 11:
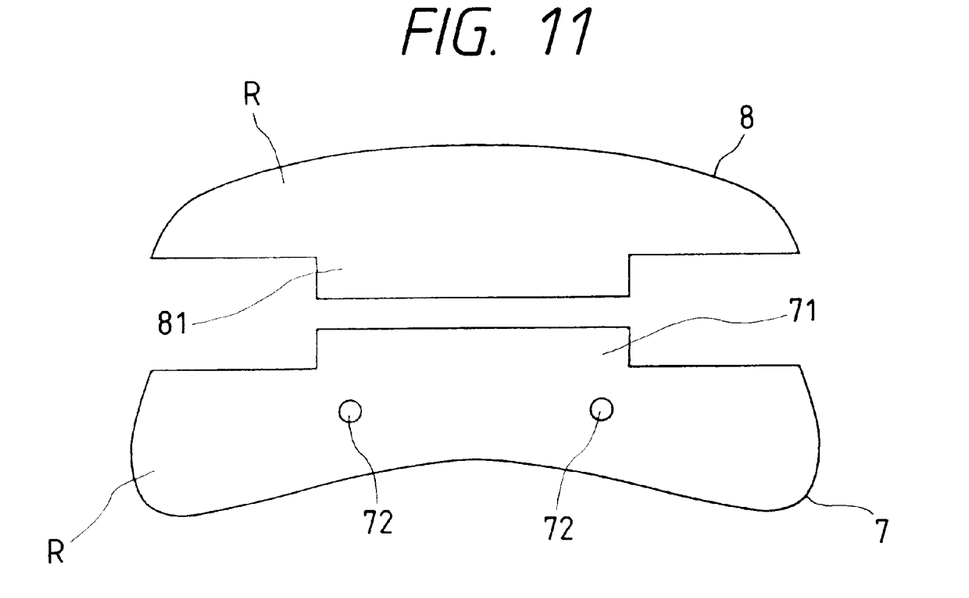
FIG. 11 is a plan view of small skin forming pieces that form a lower surface portion of the skin.
Figure 12:
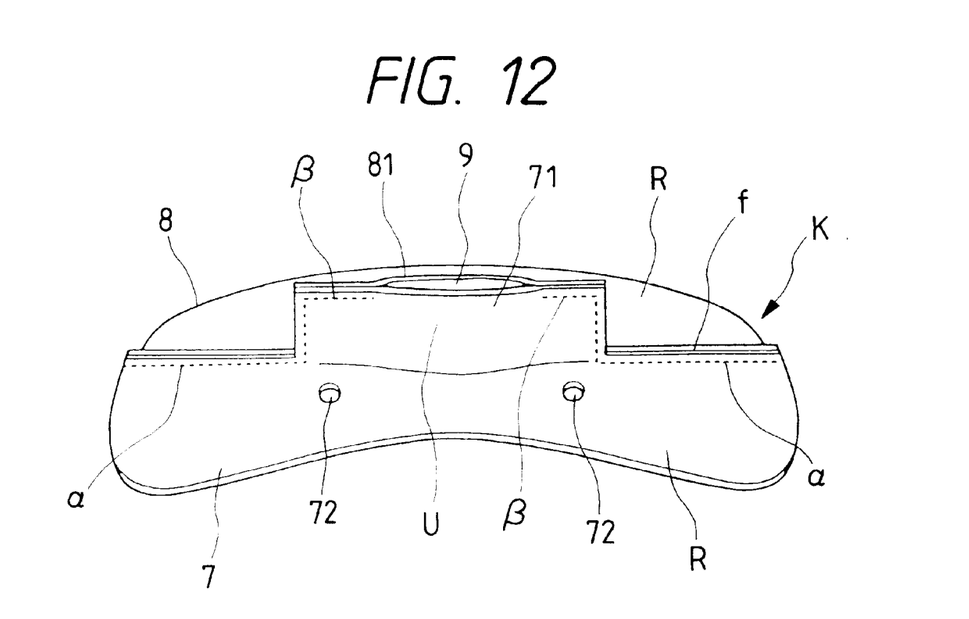
FIG. 12 is a perspective view of the back surface of the lower surface portion of the skin formed by sewing up the small skin forming pieces shown in FIG. 11 together.
Figure 13:
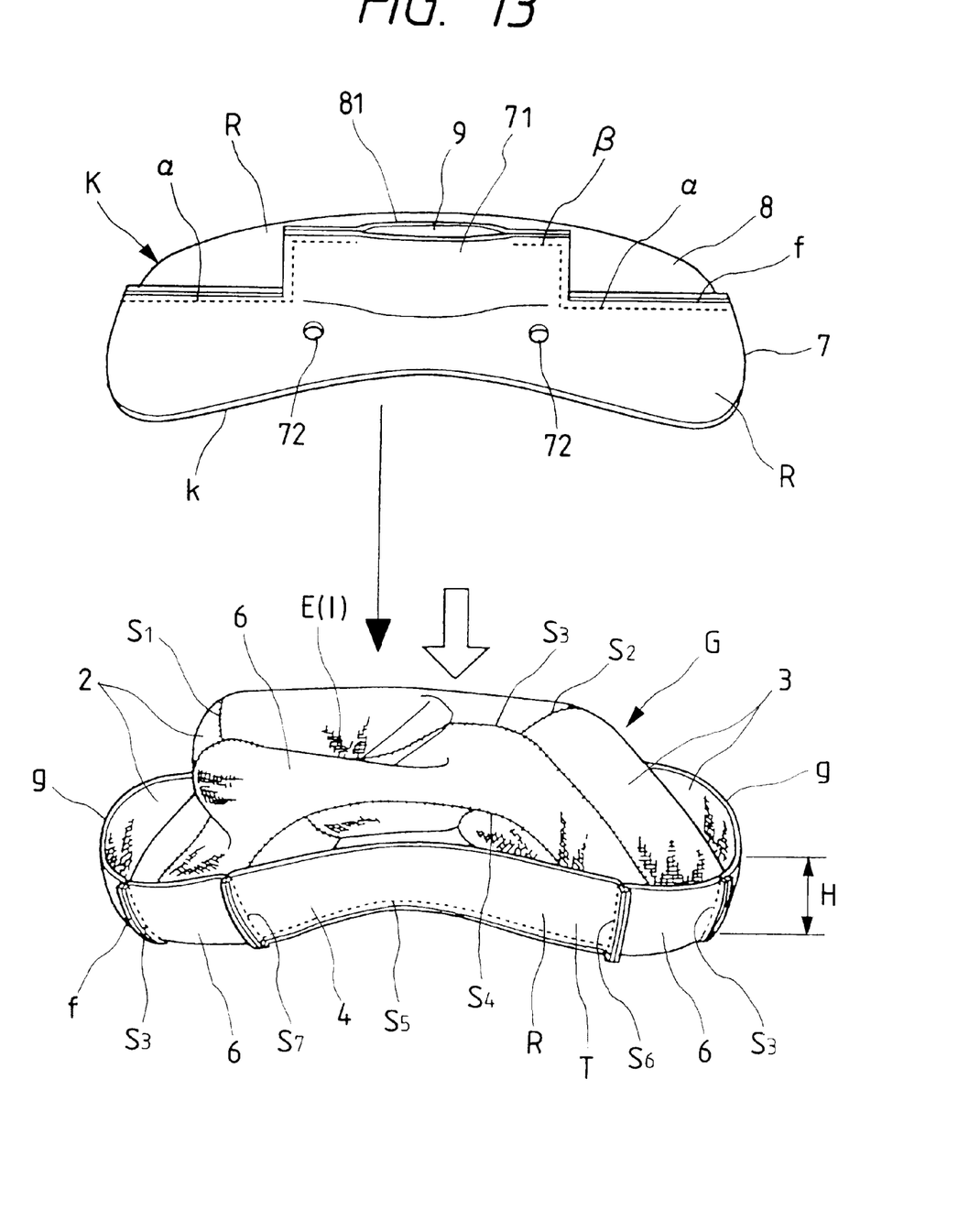
FIG. 13 is a perspective view showing a condition in which the lower surface opening peripheral portion of the main portion of the skin shown in FIG. 10 is turned up to get ready to be overlapped on the lower surface portion of the skin.
Figure 14:
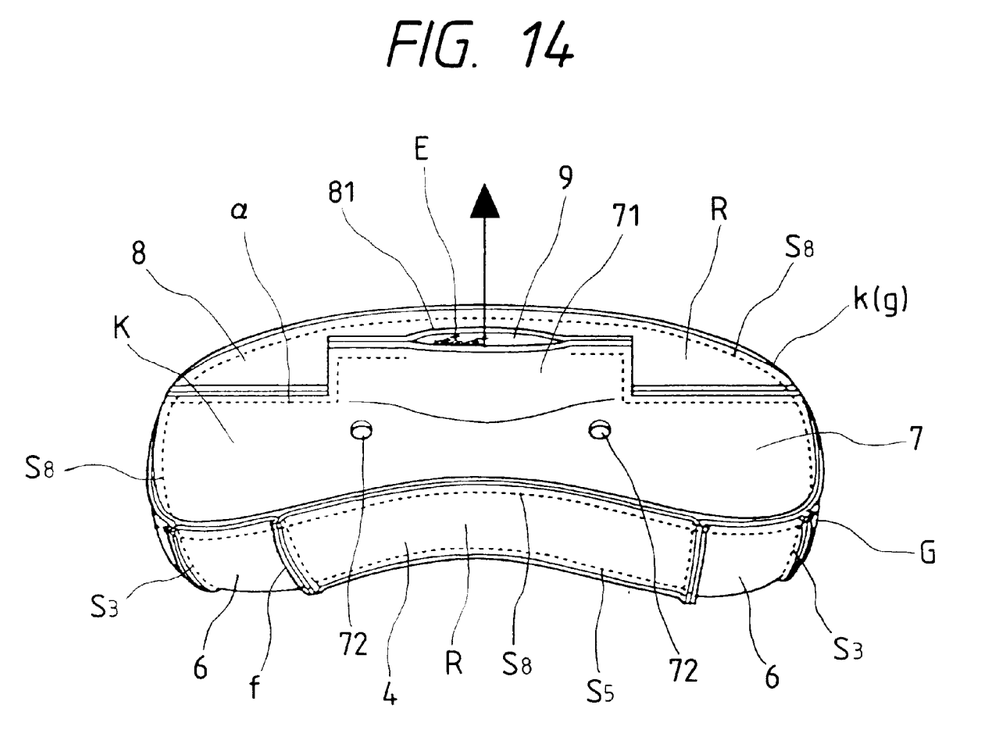
FIG. 14 is a perspective view showing a condition in which the main portion of the skin and the lower surface portion of the skin are overlapped and the overlapped peripheral portions thereof are sewn up together.

FIGS. 1 to 3 are perspective views of a head rest skin; FIG. 4 shows three skin forming pieces, each forming a part of a head rest skin; FIG. 5 is a perspective view showing a condition in which the skin forming pieces shown in FIG. 4 have been sewn up; FIG. 6 is a perspective view showing a condition in which a horseshoe-shaped skin forming piece is additionally sewn up with the already sewn up skin forming pieces shown in FIG. 5; FIG. 7 is a perspective view of a horseshoe-shaped tubed skin forming body; FIG. 8 is a perspective view of skin forming pieces that form a lower side cylindrical portion of the head rest skin so that a main portion of the skin is formed out of the tubed skin forming body shown in FIG. 7; FIG. 9 is a perspective view showing a condition in which the skin forming pieces shown in FIG. 8 are joined to the tubed skin forming body shown in FIG. 7; FIG. 10 is a perspective view of the main portion of the skin; FIG. 11 is a plan view of small skin forming pieces that form a lower surface portion of the skin; FIG. 12 is a perspective view of the lower surface portion of the skin formed by sewing up the small skin forming pieces shown in FIG. 11; FIG. 13 is a perspective view showing a condition in which a lower surface opening peripheral edge of the main portion of the skin shown in FIG. 10 is turned up so as to get ready to be overlapped on the lower surface portion of the skin; and FIG. 14 is a perspective view showing a condition in which the main portion of the skin and the lower surface portion of the skin are overlapped and the overlapped peripheral portions thereof are sewn up together.

In FIGS. 1 to 14, hatches E provided on skin forming pieces 1 to 5, a horseshoe-shaped skin forming piece 6, and small skin forming pieces 7, 8 indicate the decorated surface side of fabric skin forming pieces.

As shown in FIGS. 1 to 3, a head rest skin as a finished product is sewn up in circular form, with the inner peripheral portion on which the head of a passenger rests formed into an opening V. The leg portions of an insert (not shown) are projected from through holes 72 formed in the lower surface portion of the skin so that a head rest is fixedly supported by the apex of a not shown seat back. Reference numeral 9 denotes a slit, from which a foaming material is charged into the skin after the insert has been attached to the head rest skin, whereby a head rest with which the skin is integrated by molding is provided (FIG. 3).

A head rest skin that takes a cubic form while covering the foamed body is made of a fabric skin in the following way.

First, prior to manufacturing, skin forming pieces 1 to 5, a horseshoe-shaped skin forming piece 6, and small skin forming pieces 7, 8, which are development surfaces of a head rest skin, are prepared. A certain amount of outlet seam is given to each of the peripheral edges of the skin forming pieces 1 to 5, the horseshoe-shaped skin forming piece 6, and the small skin forming pieces 7, 8 in advance.

The skin forming pieces 1 to 5, the horseshoe-shaped skin forming piece 6, and the small skin forming pieces 7, 8 are generally made of a fabric skin or the like. More specifically, a fabric skin backed with a solid polyurethane film, a fabric skin with a urethane foamed sheet or polyurethane film integrally laminated, and the like are used. Further, a cut pile fabric formed of a synthetic fiber such as acrylic or polyamide as a pile yarn and of cotton or rayon as warp grain may be used. The cut pile fabric is resin-coated so that pile yarns will not come off.

Then, out of these skin forming pieces 1 to 5 that have been cut into predetermined shapes, three skin forming pieces 1 to 3 that form a portion extending from the inner side to the back side of the opening V are taken out (FIG. 4). As shown in FIG. 4, each of the skin forming pieces 1 to 3 is shaped so that a portion facing the opening V has a small width and a portion forming the back side has a large width.

One side edge of the skin forming piece 1 is overlapped on the side edge portion of the adjacent skin forming piece 2 in such a manner that the decorated surfaces thereof confront each other, and these side edge portions are then sewn up together (FIG. 5). Reference numeral $S_1$ denotes the thus formed seam. Similarly, the other side edge of the skin forming piece 1 is overlapped on the side edge portion of the adjacent skin forming piece 3, and these side edge portions are joined together by a sewing thread t. Reference numeral $S_2$ denotes the seam formed by the sewing thread t.

While there are many types of seams and the type of seam that is applicable is not particularly limited, all the sewing operations in this mode of embodiment are performed by lock-stitching.

The sewn up skin forming pieces 1 to 3 are overlapped on the separately prepared horseshoe-shaped skin forming piece 6 in such a manner that the decorated surfaces of the sewn up skin forming pieces 1 to 3 face the decorated surface I of the separately prepared horseshoe-shaped skin forming piece 6. Then, the outer peripheral portions of the thus overlapped skin forming pieces are lock-stitched to form a seam $S_3$ (FIG. 6).

The horseshoe-shaped skin forming piece 6 forms the front side of the head rest while sewn up with the skin forming piece 4 joining notched portions 61, 61 that are lower end side edge portions of the horseshoe-shaped skin forming piece.

Then, the skin forming pieces 1 to 3 are overlapped on the horseshoe-shaped skin forming piece in such a manner that the extreme edges b of the skin forming pieces 1 to 3 are put together and brought up to meet the inner peripheral edge portion 62 of the horseshoe-shaped skin forming piece 6 so as to have the decorated surfaces thereof facing each other. By sewing up these overlapped peripheral edge portions together, a seam $S_4$ is formed, and a horseshoe-shaped tubular skin forming body D is formed (FIG. 7). Reference numeral 0 denotes a hollow portion, which is equivalent to the upper half of the circular hollow portion into which a skin-integrated foamed body is sealed with the insert embedded therein.

On the other hand, the skin forming pieces 4, 5 that join both sides of the inner peripheral lower edge portions d of the tubed skin forming body D are prepared (FIG. 8).

The skin forming piece 4 is sewn up with the horseshoe-shaped skin forming piece 6 to thereby form the front surface portion of the head rest. The skin forming piece 5 is sewn up with the skin forming piece 4 to thereby form a portion extending from the inner peripheral portion of the opening V to the back surface portion. The skin forming pieces 4, 5 are arranged in such a manner that the decorated surfaces thereof are overlapped one upon another along the corresponding side edges, and the overlapped peripheral edge portions are thereafter sewn up together. A seam $S_5$ is formed by such sewing operation.

The tubular skin forming body D is thereafter positioned with the right side out, and has the inner peripheral lower edge portion d thereof sewn up with end edges of the skin forming pieces 4, 5 (FIG. 9). Reference numeral $S_6$ denotes the thus formed seams. Further, the other ends of the skin forming pieces 4, 5 are sewn up with the other inner peripheral lower edge portion d of the tubular skin forming body D (FIG. 10). Reference numeral $S_7$ denotes the thus formed seam.

With the skin forming pieces 4, 5 sewn up together with the tubular skin forming body D, a main portion G of the pierced head rest skin is formed. It may be noted that the sewing operation in this process is performed with the decorated surfaces overlapped one upon another and that the seams $S_6$, $S_7$ are formed in such a manner that the outlet seams f come out on the back surface side of the skin.

The thus formed main portion G of the skin still requires a lower surface portion K of the skin to complete the head rest skin as a finished product. The lower surface portion K of the skin corresponds to the lower surface of the head rest.

By the way, while the aforementioned main portion G of the skin is completed, two small skin forming pieces 7, 8 that will form the lower surface portion K of the skin are prepared (FIG. 11).

Both small skin forming pieces 7, 8 are such that the middle portions 71, 81 of the confronting edges thereof are projected in rectangular form, and that through holes 72, 72 are formed at both leftward and rightward positions close to the confronting edge of the small skin forming piece 7. The through holes 72 allow the leg portions of the insert to be inserted thereinto. Circular pads (not shown) are attached to the peripheries of the through holes 72 if necessary.

The middle portions 71, 81 are overlapped one upon another in such a manner that the decorated surfaces of the small skin forming pieces 7, 8 confront each other. Then, both end portions of the confronting edges are sewn up together in such a manner that outlet seams f come out on the back surface side of the skin (FIG. 12). The upper edges of the middle portions 71, 81 are left unjoined, and L-shaped seams α are formed along the confronting edges including both side edges of the middle portions 71, 81. It may be noted that seams β are also formed by sewing up the upper edge end portions of the middle portions 71, 81 in this mode of embodiment.

By forming the seams α, β at two positions on both sides, the lower surface portion K of the skin is completed (FIG. 13). With the seams β formed only along the upper edge end portions, a slit 9 is formed between the middle portions of the small skin forming pieces 7, 8, the slit 9 serving also as a foamed material charging port.

When the lower surface portion K of the skin and the main portion G of the skin have been thus prepared, the operation of sewing up these portions together is started.

Prior to the sewing operation, first, a back surface R of the skin is put outside by turning up a lower opening peripheral edge g and folding in the decorated surface of the main portion G of the skin. The skin forming piece 4 can be folded easily along the seam $S_5$ between the skin forming piece 4 and the skin forming piece 5. Therefore, by turning up the lower surface opening peripheral edge g, a predetermined height H is given to the turned-up edge.

Then, the upper half of the main portion G of the skin is pushed down onto an upper surface opened saucer-like body T having such predetermined height H using a hand or the like as indicated by the thick arrow in FIG. 13. The upper surface opened saucer-like body T has some accommodating space, so that the upper half of the main portion G of the skin can be neatly folded therein.

Then, a peripheral edge k of the lower surface portion K of the skin is overlapped on the lower surface opening peripheral edge g of the main portion G of the skin in such a manner that the decorated surfaces of both edges k, g confront each other with the back surface R of the lower surface portion K of the skin facing outside (upward), and the overlapped peripheral edge portions are sewn up together (FIG. 14).

Here, at the time of forming a seam $S_8$ that extends around the lower surface portion K of the skin, a flat surface is provided in order to spread the small skin forming pieces 7, 8 out so as to be shaped into the lower surface of the head rest. Further, the lower surface opening peripheral edge g of the main portion G of the skin is also spread out when the decorated surface thereof is overlapped on that of the corresponding peripheral edge k, thereby providing the flat surface. As a result, the sewing operation can be performed with ease.

By sewing the lower surface portion K up with the main portion G of the skin this way, the head rest skin is completely formed. However, the head rest skin is arranged inside out at this stage.

Thus, as the final step, the main portion G of the skin on the decorated surface side which is inside is pulled out in order to put the right side out by putting a hand into the slit 9 (as indicated by the arrow in FIG. 14). After having put the main portion G of the skin the right side out, a desired head rest skin such as shown in FIGS. 1 to 3 is obtained.

According to the thus arranged head rest skin manufacturing method, the manufacturing process is simple with no complicated sewing operations involved, and the cost of manufacture can be reduced. The side edges of the horseshoe-shaped skin forming piece 6, the skin forming pieces 1 to 5, and the small skin forming pieces 7, 8, as well as the confronting portions of the lower surface opening peripheral edge g and the peripheral edge k of the lower surface portion K can be sewn up with these side edges and confronting portions arranged flat. Therefore, the sewing operation is easy, and performed simply and quickly using a general-purpose sewing machine or the like.

While the sewing operation of a cubically formed head rest skin in particular been so difficult in the past, according to the method of the present invention, the main portion G of the skin and the lower surface portion K of the skin can be prepared in well-organized procedure. Further, the operation of sewing the main portion G and the lower surface portion K of the skin, which is the final operation, is performed smoothly by putting the back surface R of the skin out while turning up the lower surface opening peripheral edge g of the main portion of the skin and folding in the decorated surface I. In addition, in this mode of embodiment, the skin forming piece 4 is easily folded along the seam $S_5$, so that the upper surface opened saucer-like body T can be formed. Therefore, the upper half of the main portion G of the skin can be accommodated in the accommodating space of the upper surface opened saucer-like body T. As a result, the operation of sewing the lower surface portion K of the skin and the cubic main portion G of the skin can be performed without difficulty by taking advantage of these portions being arranged flat.

Since the horseshoe-shaped skin forming piece 6, the skin forming pieces 1 to 5, and the small skin forming pieces 7, 8 are sewn up inside out, the outlet seams of the jointed portions do not appear on the decorated surface I of the skin that is arranged the right side out. As a result, a good looking, high quality head rest skin can be provided.

Further, the head rest skin manufacturing method according to this mode of embodiment requires that the skin forming pieces and the like 1 to 8 be arranged the right side out in the final process, and for this operation a slit is necessary. Since the foaming material charging slit 9 can be used also for this purpose, the head rest skin manufacturing method of the present invention is advantageous in this respect as well. That is, a skin used for skin-integrated molding must have a foaming material charging port (slit). In addition, the charging port is large enough to be used for arranging the skin forming pieces and the like 1 to 8 the right side out. Therefore, it is no longer necessary to newly form a slit in the skin, which means that no additional operation is involved, nor does it impair the appearance of the product.

According to such head rest skin manufacturing method, the outlet seams f are not exposed on the decorated surface I, nor is any fastener or the like used so that skin-integrated molding operation can be performed simply as well as easily. As a result, the method is extremely beneficial in the manufacture of head rests.

Further, in this mode of embodiment, the use of the horseshoe-shaped skin forming piece 6 contributes to reducing the number of seams. Therefore, by assigning the horseshoe-shaped skin forming piece to the front side of the head rest, the head rest gives an extremely good feeling to a user when the user puts his or her head on the head rest thus provided.

In addition, a bag-like body U is formed on the lower surface portion K of the skin by the seams $\alpha$, $\beta$, and the slit 9 is recessed from the decorated surface I. Therefore, a foaming material set jig (not shown) can be attached easily. Further, since foaming is being implemented with the middle portions 71, 81 arranged inside the skin, the slit 9 is easily closed with the middle portions put together by the foaming pressure.

It goes without saying that skin-integrated molding can be implemented. Therefore, the operation by the so-called "postcovering method" in which a skin is covered over a foamed body after foaming has been completed is dispensed with, and the skin is integrated with the foamed body, so that the skin is not wrinkled, and energy saving operation is achieved, and in addition, high quality products can be provided.

It may be noted that the present invention is not limited to the aforementioned mode of embodiment, but may be modified in various modes in accordance with the object and application. The shape, size, material of the skin forming pieces 1 to 5, the horseshoe-shaped skin forming piece 6, the small skin forming pieces 7, 8, and the like can be selected appropriately in accordance with the object. While the skin forming pieces and the main portion G of the skin and the lower surface portion K of the skin are joined by sewing in the aforementioned mode of embodiment, they may be joined also by an adhesive or by means of hot joining methods based on high frequency and ultrasonic wave. Further, the present invention is not limited to head rest skins of the pierced type but to those of various shapes. The number of pieces of the skin forming pieces 1 to 6, the small skin forming pieces 7, 8, and the like can be adjusted depending on the application. Further, the skin forming pieces 1 to 5, the horseshoe-shaped skin forming piece 6, and the small skin forming pieces 7, 8 may not necessarily be made of fabric skins, but may be made of slush molded skins, blow molded skins. These skins may, of course, be used partially.

As described in the foregoing, the head rest skin manufacturing method of the present invention provides an easy method with the use of an ordinary sewing machine or the like. Head rest skins can be made extremely simply without going through the cumbersome operation. In addition, all the joined portions such as outlet seams are put on the back surface side of the skin. Therefore, head rest skins that are extremely satisfactory in terms of quality, operating cost, and the like can be provided. In addition, head rests made of these skins become a high quality product. Hence, the invention can provide enormous advantages.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of manufacturing a head rest skin comprising the steps of:

preparing a main portion of the skin that does not include a lower surface portion;

turning up a lower surface opening peripheral edge of the main portion of the skin to expose a back surface of the skin and folding a decorated surface of the main portion of the skin into the turned up lower surface opening peripheral edge;

overlapping a peripheral edge of the lower surface portion on the lower surface opening peripheral edge of the main portion of the skin in such a manner that decorated surfaces of the peripheral portions confront each other with the back surface of the lower surface portion of the skin facing outward and sewing up the overlapped peripheral portions together; and pulling the main portion of the skin folded in the turned up lower surface opening peripheral edge through a slit formed in the lower surface portion of the skin.

2. A method of manufacturing a head rest skin according to claim 1, including the step of forming the main portion of the skin by joining a plurality of skin forming pieces.

3. A method of manufacturing a head rest skin according to claim 2, including the step of forming the main portion of the skin from a horseshoe-shaped skin forming piece and a plurality of skin forming pieces; and the main portion of the skin for a pierced head rest skin is prepared by the steps of:

overlapping the horseshoe-shaped skin forming piece on the respective skin forming pieces in such a manner that decorated surfaces thereof confront one another; and forming a horseshoe-shaped tubular skin forming body by sewing up the overlapped peripheral portions together.

4. A method of manufacturing a head rest skin according to claim 1, including the step of forming the lower surface portion of the skin by joining two small skin forming pieces having middle portions of confronting edges thereof projecting outward and by forming the slit between the middle portions by leaving a part of the middle portions unjoined.

5. A method of manufacturing a head rest skin according to claim 3, wherein preparing the main portion of the skin for a pierced head rest skin includes the steps of:

overlapping skin forming pieces for joining both sides of inner side lower edge portions of the tubular skin forming body one upon another in such a manner that decorated surfaces thereof confront each other; and sewing up the overlapped peripheral portions together, such that both sides of the tubular skin forming body are joined.

6. A method of manufacturing a head rest skin comprising the steps of:

preparing a main portion of the skin that does not include a lower surface portion;

turning up a lower surface opening peripheral edge of the main portion of the skin to expose a back surface of the skin and folding a decorated surface of the main portion of the skin into the turned up lower surface opening peripheral edge;

overlapping a peripheral edge of the lower surface portion on the lower surface opening peripheral edge of the main portion of the skin in such a manner that decorated surfaces of the peripheral portions confront each other with the back surface of the lower surface portion of the skin facing outward and joining the overlapped peripheral portions together; and pulling the main portion of the skin folded in the turned up lower surface opening peripheral edge through a slit formed in the lower surface portion of the skin.

7. A method of manufacturing a head rest skin according to claim 6, including the step of forming the main portion of the skin by joining a plurality of skin forming pieces.

8. A method of manufacturing a head rest skin according to claim 7, including the step of forming the main portion of the skin from a horseshoe-shaped skin forming piece and a plurality of skin forming pieces; and the main portion of the skin for a pierced head rest skin is prepared by the steps of:

overlapping the horseshoe-shaped skin forming piece on the respective skin forming pieces in such a manner that decorated surfaces thereof confront one another; and forming a horseshoe-shaped tubular skin forming body by joining the overlapped peripheral portions together.

9. A method of manufacturing a head rest skin according to claim 6, including the step of forming the lower surface portion of the skin by joining two small skin forming pieces having middle portions of confronting edges thereof projecting outward and by forming the slit between the middle portions by leaving a part of the middle portions unjoined.

10. A method of manufacturing a head rest skin according to claim 8, wherein preparing the main portion of the skin for a pierced head rest skin includes the steps of:

overlapping skin forming pieces for joining both sides of inner side lower edge portions of the tubular skin forming body one upon another in such a manner that decorated surfaces thereof confront each other; and joining the overlapped peripheral portions together, such that both sides of the tubular skin forming body are joined.

* * * * *